Figure 3:
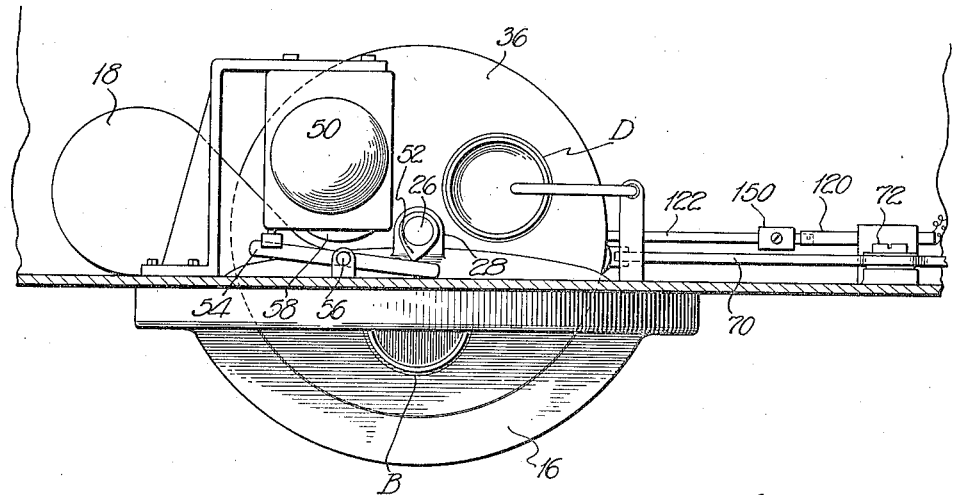

March 4, 1941.   J. F. WELLEKENS   2,233,462
CUP DELIVERING MECHANISM
Filed Aug. 14, 1937   3 Sheets-Sheet 1
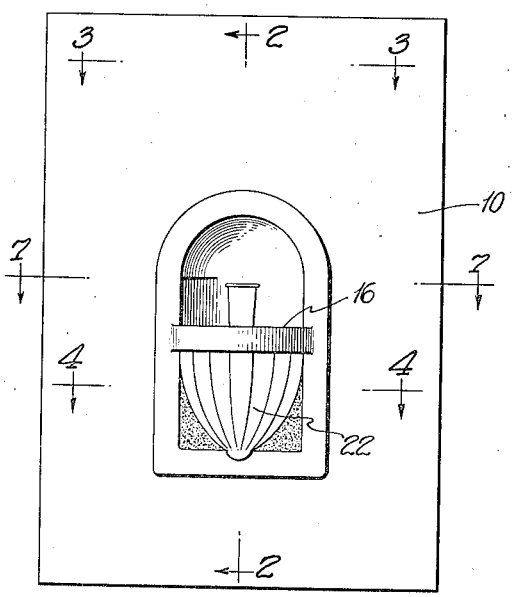
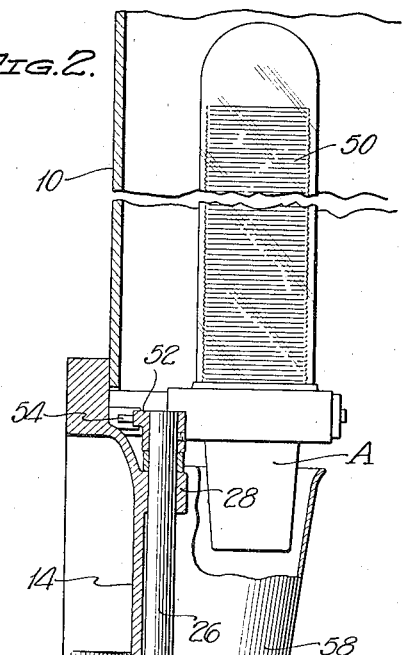
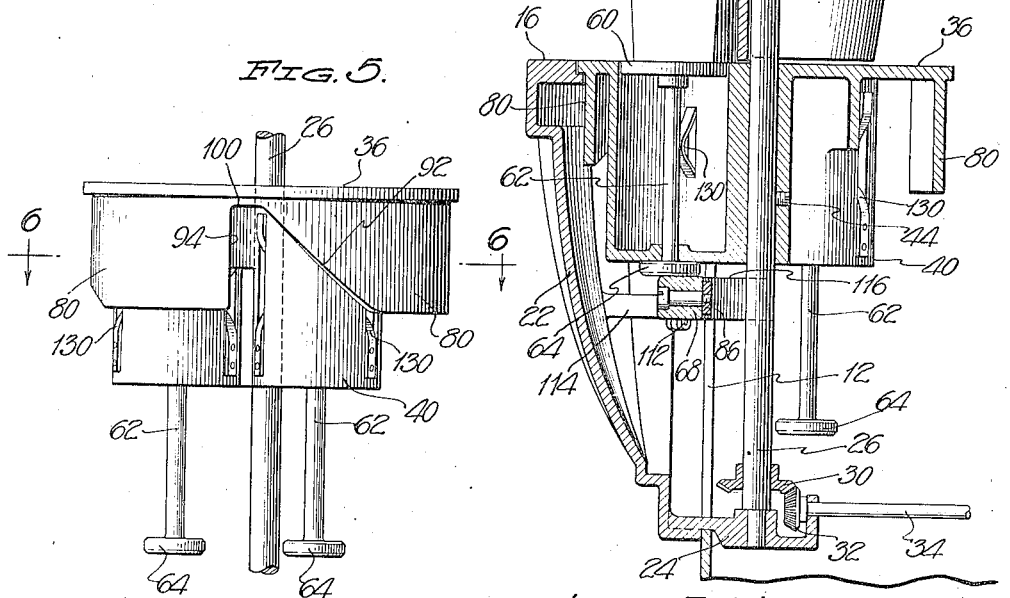
JOHN F. WELLEKENS.
INVENTOR.
BY Ely Pattison
ATTORNEYS.

March 4, 1941.  J. F. WELLEKENS  2,233,462
CUP DELIVERING MECHANISM
Filed Aug. 14, 1937   3 Sheets-Sheet 2

JOHN F. WELLEKENS.
INVENTOR.
BY Ely Pattison
ATTORNEYS.

March 4, 1941.  J. F. WELLEKENS  2,233,462
CUP DELIVERING MECHANISM
Filed Aug. 14, 1937   3 Sheets-Sheet 3
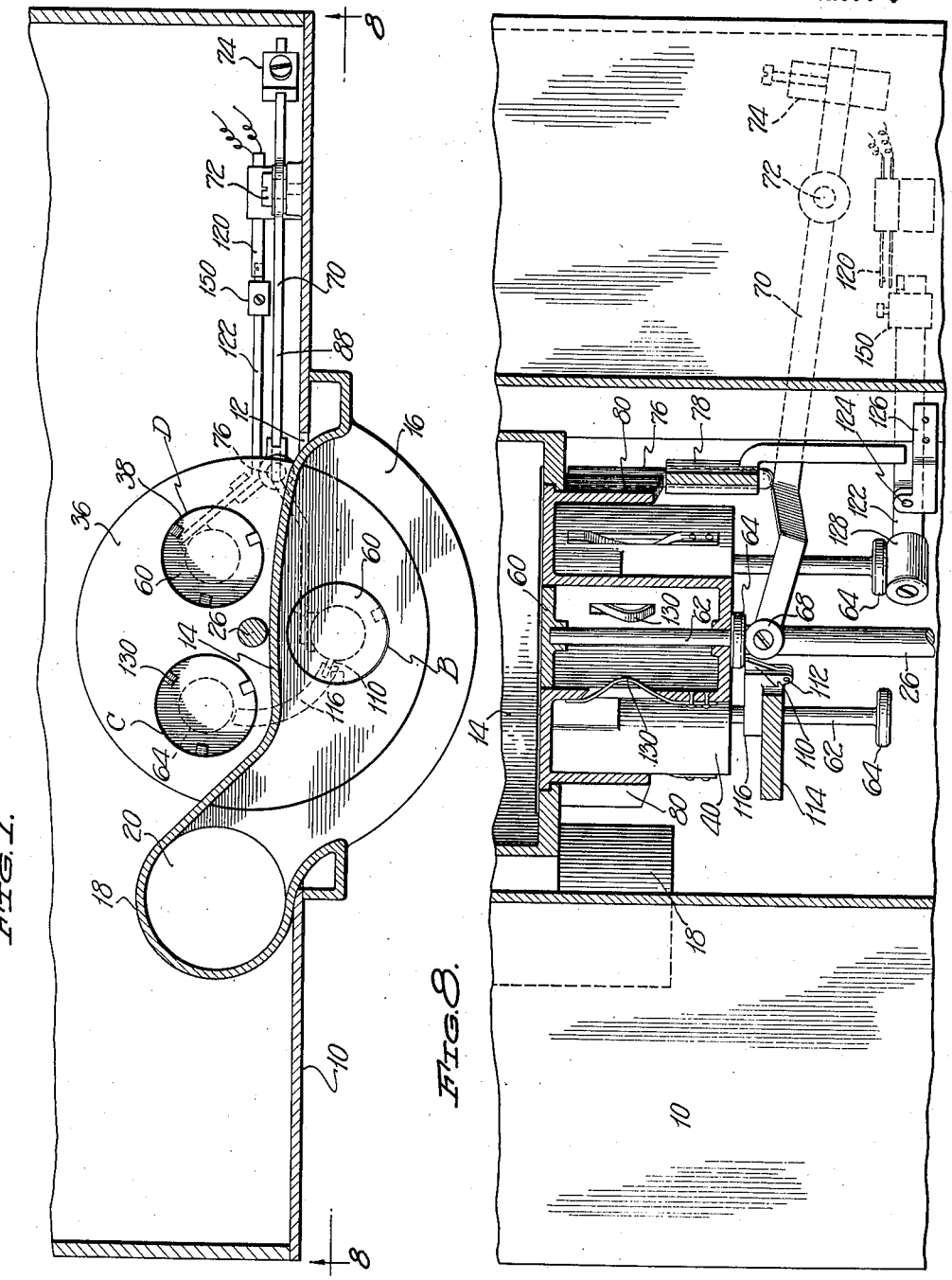
JOHN F. WELLEKENS.
INVENTOR.
BY Ely Pattison
ATTORNEYS.
WITNESS:

Patented Mar. 4, 1941

2,233,462

UNITED STATES PATENT OFFICE 2,233,462

CUP DELIVERING MECHANISM

John F. Wellekens, New York, N. Y.

Application August 14, 1937, Serial No. 159,043

8 Claims. (Cl. 198—209)

This invention relates to new and useful improvements in delivering mechanisms and more specifically it pertains to devices of this character particularly adapted for use in connection with drink vending machines.

The present invention, while capable of use in connection with drink vending machines of any type, it particularly lends itself to use in connection with that type of vending machines in which the drink is delivered in a drinking cup ready for consummation by the purchaser thereof.

I am aware that drink vending machines in which the drink is delivered to the purchaser in a drinking cup have heretofore been constructed, but all such machines with which I am familiar have one very serious fault which often results in injury to persons in an attempt to operate such machines.

In all such machines with which I am familiar, the drink in its container is delivered through an opening in the housing of the machine. This opening provides access to the interior of the machine through which purchasers, and especially children, in the act of removing a drink thrust their hand, and it often happens that in an attempt to remove a drink before the delivery operation has ceased, the hand becomes entangled with the operating mechanism, which results in injury to the person.

It is the primary object of the present invention to provide a new and novel cup delivering mechanism in which the several working parts are so constructed and arranged that they cannot in any way injure the hand of a person during the act of removing a cup therefrom.

A feature of the invention resides in a new and novel construction and arrangement of parts which particularly adapts the invention to use in connection with drink vending machines of the type wherein a drink is delivered from the machine in a paper cup or similar container which is discarded after a single use.

A feature of the invention resides in a new and novel construction whereby the cup or container is filled in a position in which it is hidden from view and in its filled condition, is presented to the purchaser in a manner which renders it readily accessible.

A further feature of the invention resides in a novel construction and arrangement of parts whereby a used cup will be automatically discarded from the machine upon a subsequent operation to deliver a drink, in the event that the previously used cup is placed upon the delivery platform of the machine in lieu of having been discarded.

Other features of the invention relate to certain novel and improved constructions, arrangements and combinations of parts hereinafter described and particularly pointed out in the claims, the advantages of which will be readily understood and appreciated by those skilled in the art.

The invention will be clearly understood from the accompanying drawings illustrating the invention in its preferred form and the following detailed description of the constructions therein shown.

Figure 4:
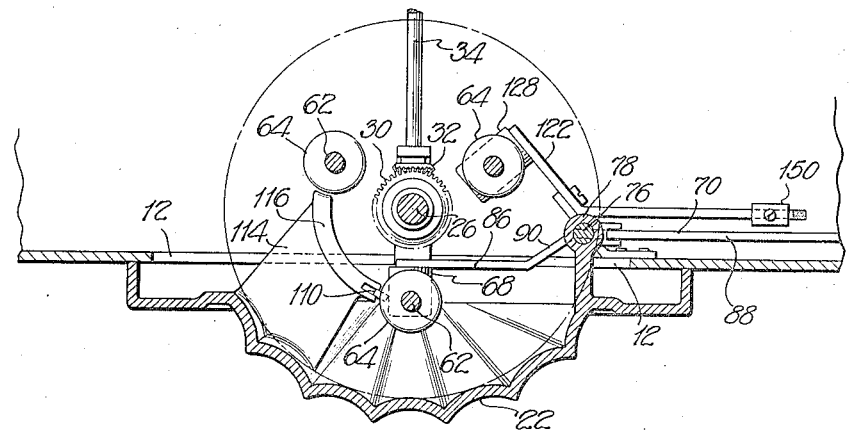
Figure 6:
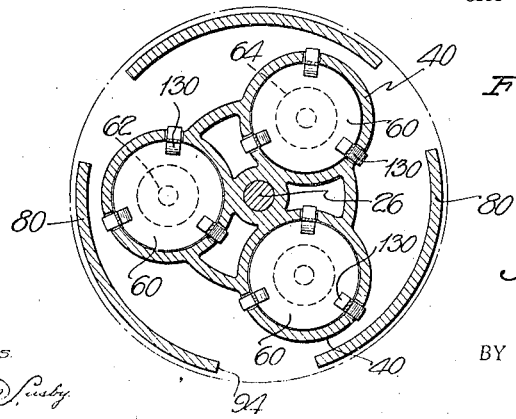

In the drawings:

Figure 1 is a view in front elevation of a portion of the housing of a drink vending machine, Figure 2 is an enlarged vertical sectional view taken substantially on the line 2—2 of Figure 1, Figure 3 is an enlarged horizontal sectional view taken substantially on the line 3—3 of Figure 1, Figure 4 is an enlarged horizontal sectional view taken substantially on the line 4—4 of Figure 1, Figure 5 is a detail view in elevation of that part of the machine which will be hereinafter referred to as the cup carrier, Figure 6 is a detail horizontal sectional view taken substantially on the line 6—6 of Figure 5, Figure 7 is a horizontal sectional view on an enlarged scale taken substantially on the line 7—7 of Figure 1, and;

Figure 8 is a vertical sectional view taken substantially on the line 8—8 of Figure 7.

Referring specifically to the drawings, the reference character 10 designates a portion of the housing of a drink vending machine. The housing, as best illustrated in Figures 4 and 7, is provided with an opening 12, and it is within this opening 12 that the cup carrier is mounted. Extending transversely of the housing there is a partition 14, and this partition carries a flange or curved member 16 which projects forwardly of the housing, as best illustrated in Figure 7. The partition 14 has an extension 18 which is substantially circular in form, and the member 16 is cut away at one end to provide an opening 20, the purpose of which will be hereinafter described. Depending from the member 16 there is a wall 22 which may be ornamented in any desired manner and which has a bearing arm 24, which extends through the opening 12 of the housing and provides the lower supporting bearing for a vertically disposed shaft 26. The partition 14, heretofore mentioned, is formed with a bearing 28 in which the upper end of the shaft 26 is mounted. The shaft 26 carries a beveled gear 30, and meshing therewith there is a beveled gear 32 carried by a shaft 34 which may be driven in any desired manner, preferably by the same source of power which operates the drink vending mechanism and which comprises the subject matter of a separate application. The connection between the shaft 34 and the source of power will be such that when the machine is operating to dispense a drink, the cup delivering mechanism will be operated in proper timed relation therewith to discharge or present to the purchaser the cup with the drink therein.

The cup carrier, which is illustrated in Figure 5, comprises a rotatable platform or member 36, and as best illustrated in Figure 7, this member 36 has three openings 38. Depending from the platform 36 there are three cup receiving recesses 40, and the openings 38 provide open ends for these cup receiving recesses 40 in order that cups may be received therein and discharged therefrom. The cup carrier is mounted upon the shaft 26 in such a manner that the upper face of its platform will occupy a position in the same plane as the upper face of the member 16, and it may be secured in this position by a set screw or other means 44. Thus it will be apparent that as the shaft 26 is rotated, the cup carrier will likewise be rotated.

The parts are of such proportions and bear such relation to each other that the platform 36 of the cup carrier rotates directly beneath the lower edge of the partition 14, heretofore mentioned, in such a manner that the partition 14 will prevent the insertion of a part of the person, for example, the hand or other articles which might be introduced through the opening 12 and interfere with proper operation of the machines, if it were not for the partition 14.

In operation, upon rotation of the cup carrier 36, cups are placed in the cup receiving recesses at a point behind the partition 14 and are elevated or moved out of said recesses in order that they may be grasped by a prospective purchaser at a point in front of the partition 14, and this is accomplished in the following manner.

To the rear of the housing 10 of the machine there is a cup magazine 50 which may be of conventional form and which is automatically operated by a cam 52 upon the upper end of the shaft 26, and by a pivoted lever 54 pivotally mounted as at 56, which lever is rocked about its pivotal point by the cam 52 to effect a discharge of a cup A into a funnel shaped guide member 58. As the cup A is discharged into the member 58, the said member 58 will direct the cup into one of the three cup receiving recesses 40, it being understood that the mechanism is so timed that a cup A will not be discharged until such time as a cup receiving recess is positioned beneath the member 58. The member 58 and the cup magazine 50 are positioned behind the partition 14 and it will thus be apparent that the cups are discharged into the cup receiving recesses successively after they have passed to a point to the rear of the partition 14.

Means is provided in each cup receiving recess to elevate the cup out of the recess when the recess is moved to position in front of the partition 14. This means comprises an elevating bottom member 60 for each cup receiving recess and which is adapted to be elevated when the cup receiving recess is brought to position in front of the partition 14. To effect vertical movement of the elevating bottoms of the cup receiving recesses, said bottoms are mounted on a rod 62, the lower end of which is provided with a bearing member 64, and this bearing member 64 engages, as the cup carrier rotates, a roller 68 mounted upon the end of a pivoted lever 70, said lever being pivoted as at 72. This lever 70 carries a counter-balance 74 which maintains the lever normally in its elevated position, in which it is shown in Figure 8. In said Figure 8 the bottom 60 of one of the cup receiving recesses is shown in its elevated position, in which position it is maintained by the counter-balance 74 of the lever 72, which counter-balance maintains the roller 68 in its elevated position.

The pivoted lever 70 is rocked about its pivotal point to depress the end 68 in order that the bearing member 64 may pass over the same in order to be engaged thereby by means of a pin or sliding shaft 76 mounted in a bearing 78, see Figure 4, which pin is depressed by a cam 80 of which there are three in equi-distantly spaced relation depending from the platform 36 of the cup carrying member. As best illustrated in Figures 4 and 7, the pivoted lever 70 has two substantially parallel portions 86 and 88 connected by an angular off-set portion 90, by means of which the portion 86 upon which the roller 68, heretofore mentioned, is mounted, is brought to a position in front of the partition 14 but below the lower edge of the same in order to operate the elevating bottom of a cup receiving recess when the cup receiving recess passes to position in front of the partition. As best illustrated in Figure 5, the cams 80 have an angular cam portion 92, at one end and an abrupt or straight portion 94 at the other end, leaving a sufficient gap between the portions 92 and 94 to permit the pin or shaft 76, heretofore mentioned, to ride up into the portion 100 of the gap between the ends of the adjacent cams 80 and permit the counter-balance lever 70 to elevate the bottom of the cup receiving recess when in position in front of the partition 14. Means is provided to retain the elevating bottom of each cup receiving recess in elevated position until such time as the recess passes from position in front of the partition 14 to the rear of said partition. In the present embodiment of the invention this means comprises a spring actuated latch 110 pivotally mounted as at 112 in a suitable transversely extending rigid element 114. Extending along the rigid element 114 there is a curved trackway 116, and this trackway 116 provides means for engagement with the bearing member 64 to retain the elevating bottom in its elevated position until the bearing member 64 passes clear of the end of said trackway 116, in which position it is shown in Figure 7. The bearing member 64 passes free of the end of the track 116, the bottom 60 drops by gravity to a position in the bottom of the cup receiving recess, leaving the cup receiving recess free to receive a cup from the magazine 50.

The device is started in operation by closing of the switch designated 120 in Figure 8, and this is accomplished by means of a gravity operated pivoted lever 122 mounted as at 124 in a suitable bracket 126, see Figure 8. This lever 122 carries a roller 128 which is adapted to engage the bearing members 64 under conditions which will be herein specifically described.

Each cup receiving recess has projecting thereinto a plurality of springs 130 which, although they are rigid enough to position the cups within the recesses, are not sufficiently rigid to prevent free movement of the elevating bottom through the cup receiving recess. The cup carrier is adapted to position the cups in three positions, namely, position B, which is the delivery position, position C, that position in which the cup is placed within a cup receiving recess, and the position D, which is that position in which the cup is filled.

The roller 128 carried by the pivoted lever 122 is positioned directly beneath the position D of the cup receiving recesses, as illustrated in Figure 7.

With the parts in the position in which they are shown in Figure 7, a full cup is in the position B, an empty cup is in the cup recess in position C, as is also an empty cup in the recess of the position D, and a drink has been delivered for consummation.

Upon the insertion of a coin and the operation of the drink vending mechanism, not shown, the cup in the position D will be filled with a drink, and upon becoming filled, will depress the roller 128, rocking the lever 122 about its pivotal point 124 against the action of the weight 150 to close the switch 120, which will set in motion the means for driving the shaft 34. As the shaft 34 is driven, the shaft 26 will be driven to rotate the cup carrier and move the cup carrier to a position where the filled cup will be in front of the partition 14. In this movement the lower edge of the cam 80 will hold the pivoted lever 70 depressed until the upper end of the pin or shaft 76 reaches the straight portion 94, whereupon the pin or shaft 76 will pass to the portion 100 of the gap between two cams 80 and permit the lever 70 to rock about its pivotal point to the position in which it is shown in Figure 8 with the bottom 60 of the cup receiving recess in its elevated position. In this position, the cup will be presented as in Figure 1 for the consumer to remove and consume the drink. Should the consumer place the empty cup back again upon the platform of the cup carrier, upon the next operation the partition 14 will remove the cup from the carrier and cause its discharge into the opening 20 into a suitable waste receptacle, not shown. Upon the next operation, the cup receiving recess, which was originally in the position D and passed to the position B, will pass to the position C, whereupon it will receive a cup, and that cup formerly in the position C will pass to the position D to be filled with a drink upon the next operation of the machine. This sequence of operation takes place each time the machine is operated and, as will be noted, the cups are placed in the cup recesses and are filled at points behind the partition 14 and are delivered to the purchaser at a point in front of the partition 14, by which arrangement the top face of the platform of the cup carrier is flush with the member 16 and the recesses are closed by the bottoms 60 which are in the elevated position, thus preventing access or accidental movement of the hand or other articles to position at the rear of the partition 14 at all times.

From the foregoing it will be apparent that the present invention provides a new and improved cup delivering mechanism which is especially adapted for use in connection with automatic drink vending machines, and while the invention has been herein disclosed in its preferred form it is understood that it is not to be limited to the specific construction shown and that it may be practiced in other forms within the scope of the appended claims.

Having thus described the invention, what is claimed as new is:

1. In a cup delivering mechanism for drink dispensing machines, a housing, a rotatable cup carrier, a partition extending across said rotatable cup carrier, means for positioning a cup in said cup carrier at a point behind said partition, means for rotating the cup carrier to pass the cup beneath said partition, and means for elevating the cup in front of said partition.

2. In a cup delivering mechanism for drink dispensing machines, a housing, a rotatable cup carrier including a platform having a cup receiving recess therein, an elevating bottom for said recess, a partition extending across the cup carrier, means for rotating the cup carrier to position the cup receiving recess therein both in front of and to the rear of said partition, and means for elevating the bottom of the cup receiving recess to elevate a cup carried thereon, when said recess is in position in front of said partition.

3. In a cup delivering mechanism for drink dispensing machines, a housing, a rotatable cup carrier including a platform having a cup receiving recess therein, an elevating bottom for said recess, a partition extending across the cup carrier, means for rotating the cup carrier to position the cup receiving recess therein both in front of and to the rear of said partition, means for elevating the bottom of the cup receiving recess to elevate a cup carried thereon when said recess is in position in front of said partition, and means for maintaining the bottom of the cup receiving recess in elevated position until the cup receiving recess has passed to the rear of said partition.

4. In a cup delivering mechanism for drink dispensing machines, a housing, a rotatable cup carrier including a platform having a cup receiving recess therein, an elevating bottom for said recess, a partition extending across the cup carrier, means for rotating the cup carrier to position the cup receiving recess therein, both in front of and to the rear of said partition, means for elevating the bottom of the cup receiving recess to elevate a cup carried thereon when said recess is in position in front of said partition, and means for holding the bottom of the cup receiving recess in its elevated position while the cup receiving recess of the cup carrier is in position in front of said partition.

5. In a cup delivering mechanism for drink dispensing machines, a housing, a rotatable cup carrier including a platform having a cup receiving recess therein, an elevating bottom for said recess, a partition extending across the cup carrier, means for rotating the cup carrier to position the cup receiving recess therein both to the front of and to the rear of said partition, means for elevating the bottom of the cup receiving recess to elevate a cup carried thereon when said recess is in position in front of said partition, means for holding the bottom of said cup receiving recess in its elevated position when the cup receiving recess is in position in front of said partition, and means for retaining the bottom of said recess in its elevated position during rotary movement of the cup carrier to move the cup receiving recess from position in front of said partition to position at the rear of said partition.

6. In a cup delivering mechanism for drink dispensing machines, a housing, a rotatable cup carrier having a plurality of cup receiving recesses therein, a stationary partition extending across said cup receiving recess, means for rotating said cup carrier beneath said partition to successively position the cup receiving recess thereof both to the front of and to the rear of said partition, an elevating bottom for each of said cup receiving recesses, means for elevating the bottom of each of said cup receiving recesses when the recesses pass from position behind the partition to position in front of the partition, and means for maintaining the bottom of each of said cup receiving recesses in its elevated position while the recess is in position in front of said partition.

7. In a cup delivering mechanism for drink dispensing machines, a housing, a rotatable cup carrier having a plurality of cup receiving recesses therein, a stationary partition extending across said cup receiving recess, means for rotating said cup carrier beneath said partition to successively position the cup receiving recesses thereof both to the front of and to the rear of said partition, an elevating bottom for each of said cup receiving recesses, means for elevating the bottom of each of said cup receiving recesses when the recesses pass from position behind the partition to position in front of the partition, means for maintaining the bottom of each of said cup receiving recesses in its elevated position while the recess is in position in front of said partition, and means for retaining the bottom of each cup receiving recess in its elevated position until the cup receiving recess has completely cleared the partition in its movement to the rear thereof.

8. In a cup delivering mechanism for drink dispensing machines, a housing having an opening in the side thereof, a partition extending across said housing at the rear of said opening for preventing access to the interior of the housing through said opening, a cup carrier mounted beneath said partition and comprising a rotatable platform having a plurality of cup receiving openings therein, each of which communicates with a cup receiving recess beneath the rotatable platform, an elevating bottom for each of said cup receiving recesses, means for rotating the cup carrier beneath said partition, means for elevating the bottom of each cup receiving recess when the recess is in position in front of said partition, and means for lowering the bottom of each cup receiving recess when the cup receiving recess is in position at the rear of said partition.

JOHN F. WELLEKENS.